Patented Oct. 16, 1934

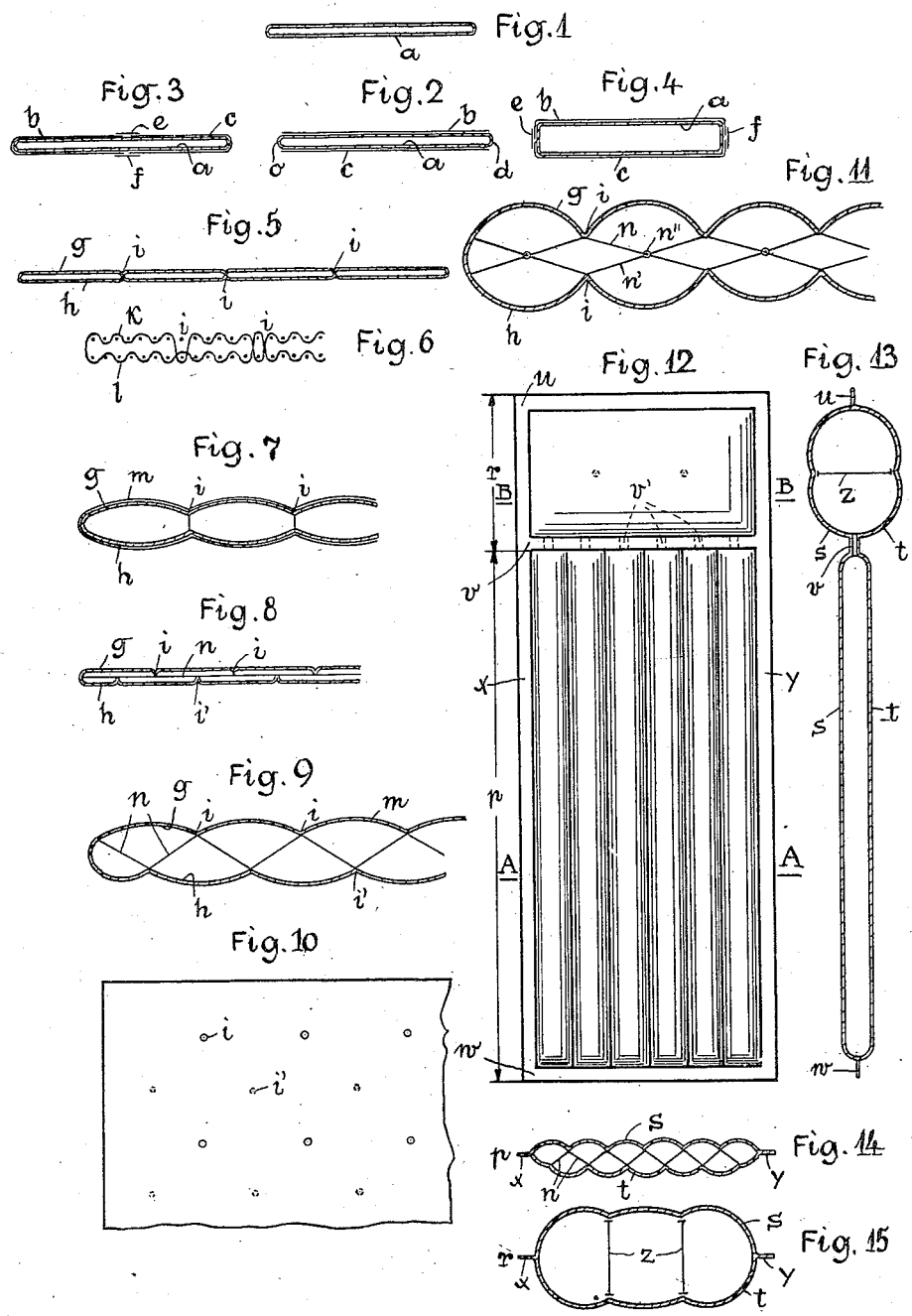

1,976,793

UNITED STATES PATENT OFFICE 1,976,793

AIR-TIGHT CLOSED HOLLOW BODY

Stefan Mangold, Vienna, Austria

Application August 11, 1931, Serial No. 556,374
In Austria August 14, 1930

1 Claim. (Cl. 5—350)

Up to the present the manufacture of hollow bodies closed air-tight on all sides, such as pillows, cushions, mattresses, swimming-bodies, hot-water bottles and the like, is effected by uniting single sheets of rubber or waterproof cloth or the like by a suitable adhesive substance to a hollow body of the desired form or size. It is also known to arrange between the thus already air-tight surfaces of the hollow body ribs which are either cemented in or sewn in and the seams of which are afterwards glued together. It is further known to arrange between the surfaces of the hollow body an intermediate layer and connect it with the surfaces in a staggered relationship so that cells are formed. This is especially with the two last mentioned modes of manufacturing the case, in which no smooth surfaces are concerned, but surfaces interrupted by local deepenings or deepenings extending along lines, such as for instance with mattresses or the like filled with pressure air, in which the deepenings are caused by connection between the two surfaces which prevent a substantial change of the form of the hollow body when it is filled with pressure air.

The invention has for its object to do away with all these drawbacks, i. e. to manufacture hollow bodies closed air-tight from all sides both of simple and complicated form in substantially simpler manner than up to the present.

The invention will be described with reference to the accompanying drawing in which Fig. 1 is a transverse section through a flexible tubing.

Fig. 2 is a similar view showing the application to the tubing of upper and lower layers of flexible material.

Fig. 3 shows the structure of Fig. 2 folded centrally thereof and strips e and f applied as joining members for the upper and lower layers shown in the preceding figure.

Fig. 4 illustrates the structure of Fig. 3 inflated.

Fig. 5 is a cross section of a flexible hollow body having the upper and lower surfaces connected at spaced points by weaving.

Fig. 6 is an enlarged view of a section of Fig. 5 showing the construction of the threads in joining the upper and lower surfaces of the structure shown in Fig. 5.

Fig. 7 is an enlarged view of a section of Fig. 5 showing applied thereto an exterior sheet, the structure being inflated.

Fig. 8 shows a cross section of a woven hollow body having upper and lower layers connected by threads, the location of the connecting threads on one layer being staggered as to the location of the threads on the opposite layer.

Fig. 9 illustrates the structure of Fig. 8 inflated.

Fig. 10 is a fragmentary plan view of the structure illustrated in Fig. 9.

Fig. 11 is a fragmentary transverse section of a hollow woven body, the upper and lower layers of which are connected by threads of a special arrangement.

Fig. 12 is a plan view of a mattress constructed in accordance with the invention.

Fig. 13 is a longitudinal section of the structure shown in Fig. 12.

Fig. 14 is a transverse section on the line a—a, Fig. 12.

Fig. 15 is a cross section on the line b—b, Fig. 12.

According to the invention hollow bodies closed air-tight on all sides of the above mentioned kind consist of a textile hollow body manufactured in the desired form or shape and an air-tight layer applied to its outer surfaces. The said layer may consist of rubber or similar substances, for instance balata, but also of textile fabrics, thin leather, wax- or oil cloth or the like, and be vulcanized or tightly cemented on to the textile hollow body. The two surfaces of the textile hollow body (the half-product) may be connected with each other in any desired manner the connecting places of which are covered up by the layer.

The drawing illustrates several examples of carrying out the invention.

Figures 1 to 4 show the manufacture of an air-cushion closed with the exception of a filling or inlet-opening. The air cushion is manufactured in the desired form as a textile hollow body (Fig. 1). This can be done by weaving or knitting or the like or by sewing several pieces of fabric together or in some other manner known per se. The manufacture of the textile hollow body by weaving or knitting or the like in the desired form is preferred because this is essentially simpler than other processes, and further because detrimental seams are avoided and it is easily possible to obtain an even thickness and strength. This textile hollow body a (Figs. 1, 2 and 3) is then covered on its outside with an air tight tightening layer which can be effected according to any known process. Suitable therefor is to cement or vulcanize said layer on to the under and upper surface of the substantially flat-lying textile product as indicated at b and c, (Fig. 2);

which can be done successively or simultaneously. Thereupon on the still uncovered edges o and d (Fig. 2) layers e and f, preferably in the position shown in Fig. 3, are applied or vulcanized on. The preferred form of my inflated hollow body is shown in Fig. 4.

Figures 5 to 7 show as example the manufacturing of the textile hollow body of a mattress or the like to be filled with air under pressure, by weaving, the two surfaces g, h (Fig. 5) being connected with one another at suitable distances locally or along lines at the places i by means of weaving. The upper and under layer of the fabric k and l (Fig. 6) respectively forming the surfaces g, h are, at the places i mentioned above, connected in the weaving thereof by binding in for instance single warp threads of the one layer by means of weft threads of the other layer. The surfaces g, h, then, are covered by the air-tight layer m so that the hollow body when inflated assumes the form shown in cross-section in Fig. 7.

The Figures 8 to 10 show by way of example the manufacturing of the textile hollow body for a mattress or the like by weaving, in which, according to Fig. 8, the connecting places i, i' of the two surfaces or layers g, h are staggered with relation to each other, which is attained by means of a special thread-system n in the direction of the warp or the weft or in both directions. The Figures 9 and 10 show the hollow mattress inflated after the tightening layer has been applied to it, in which the thread system n is running aslant.

The hollow bodies manufactured in the above described manner are provided with a valve, if they are to be filled with air.

A further example of carrying out the invention is shown in cross-section in Fig. 11, in which points i, i of the two surfaces or layers lying above one another (not staggered with relation to one another) are connected with each other by means of two slanting thread-systems n, n', which bind in between them a special warp n''.

In the Figures 12 to 15 an example of a mattress is illustrated in a plan view, a longitudinal section and two cross-sections along the lines A—A and B—B respectively. The mattress is produced by weaving, knitting or a like process or by sewing together several pieces of fabric, and consists of a longitudinally extending part p for support of the body, in its manner of manufacture by weaving corresponds for instance to Fig. 9 (or to Fig. 7 or 11), and a transversely extending head part r of greater thickness when inflated. The whole mattress forms a hollow textile fabric the upper layer s and under layer t of which, at the transverse parts u, v and w and at the longitudinal edges x and y, are united to one; and, there are, besides, the connecting parts n in the lying-on part p (Fig. 14). In the transverse connection v communicating channels v' can be arranged in order to afford a common air space. In the transverse part r the upper layer s and the under layer t, in the manner of a usual mattress, may be locally united with one another by means of connecting pieces z which are secured to the textile hollow body in any manner, the places of connection being covered up by the tightening layer. The application of the air-tight layer is effected preferably for both parts p, r of the fabric simultaneously and in flat-lying state of the same.

What I claim is:

A hollow hermetically sealed textile article for supporting the human body and the like, comprising opposed woven sheets connected together at spaced places by threads which are woven into said sheets, the said threads running substantially parallel to said sheets when one is laid flat upon the other, and an air-sealing layer applied to each of said sheets.

STEFAN MANGOLD.